US010144988B2

(12) United States Patent
Zhou et al.

(10) Patent No.: US 10,144,988 B2
(45) Date of Patent: Dec. 4, 2018

(54) ROTATION-SUSPENSION SMELTING METHOD, A BURNER AND A METALLURGICAL EQUIPMENT

(71) Applicant: Yanggu Xiangguang Copper Co., Ltd., Shifo Town, Yanggu County, Shandong (CN)

(72) Inventors: Songlin Zhou, Shandong (CN); Weidong Liu, Shandong (CN)

(73) Assignee: YANGGU XIANGGUANG COPPER CO., LTD., Shifo Town, Shandong (CN)

( * ) Notice: Subject to any disclaimer, the term of this patent is extended or adjusted under 35 U.S.C. 154(b) by 373 days.

(21) Appl. No.: 15/016,088

(22) Filed: Feb. 4, 2016

(65) Prior Publication Data
US 2016/0237522 A1    Aug. 18, 2016

(30) Foreign Application Priority Data
Feb. 13, 2015   (CN) .......................... 2015 1 0078260

(51) Int. Cl.
*C22B 5/14*      (2006.01)
*C22B 15/00*     (2006.01)
(Continued)

(52) U.S. Cl.
CPC ................. *C22B 5/14* (2013.01); *C22B 5/08* (2013.01); *C22B 13/02* (2013.01);
(Continued)

(58) Field of Classification Search
CPC ........................................................ F27B 17/00
See application file for complete search history.

(56) References Cited

U.S. PATENT DOCUMENTS 5,133,801 A  *  7/1992  Saarinen ............... F27D 3/0026
                                                    75/707
6,238,457 B1     5/2001  Holmi et al.
(Continued)

FOREIGN PATENT DOCUMENTS

CN          1232538 A      10/1999
CN        201280585 Y       7/2009
(Continued)

*Primary Examiner* — Scott R Kastler
(74) *Attorney, Agent, or Firm* — Schwabe Williamson & Wyatt, PC

(57) ABSTRACT

A rotation-suspension smelting method, in which a powdered sulfide concentrate and an oxygen-containing gas are sprayed into a high-temperature reaction tower. The oxygen-containing gas is divided into two parts: the second oxygen-containing gas is sprayed in the form of an annular direct flow into the reaction tower and forms a bell-shaped wind curtain; and the first oxygen-containing gas is transformed into a rotation-jet and jetted into the center of the wind curtain. In the space between the gas flows, the concentrate entering in a direction deviated towards the center is drawn in the rotation-jet, and a high-temperature off-gas is sucked in, forming a gas-particle mixed two-phase rotation-jet. The sulfide concentrate is ignited, at the same time, a melt containing matte (or metal) and slag is formed; and the matte (or metal) is separated from the slag at the bottom of the reaction tower, completing the metallurgical process.

7 Claims, 2 Drawing Sheets

(51) Int. Cl.
    *C22B 23/02*     (2006.01)
    *C22B 19/20*     (2006.01)
    *C22B 13/02*     (2006.01)
    *C22B 5/08*      (2006.01)
    *C22B 19/02*     (2006.01)
    *F23L 7/00*      (2006.01)
    *F23C 7/00*      (2006.01)
    *F23D 1/00*      (2006.01)
    *F23D 14/32*     (2006.01)

(52) U.S. Cl.
    CPC .......... *C22B 15/0028* (2013.01); *C22B 19/02* (2013.01); *C22B 19/20* (2013.01); *C22B 23/02* (2013.01); *F23C 7/004* (2013.01); *F23D 1/00* (2013.01); *F23D 14/32* (2013.01); *F23L 7/007* (2013.01)

(56) References Cited

U.S. PATENT DOCUMENTS

2013/0069287 A1    3/2013   Zhou et al.
2016/0237522 A1*   8/2016   Zhou .................. C22B 5/14

FOREIGN PATENT DOCUMENTS

| | | |
|---|---|---|
| CN | 101705369 A | 5/2010 |
| CN | 201787818 U | 4/2011 |
| CN | 102268558 A | 12/2011 |
| CN | 102560144 A | 7/2012 |
| CN | 103453774 A | 12/2013 |
| JP | 1054518 A | 2/1998 |
| WO | 9814741 | 4/1998 |

* cited by examiner

ROTATION-SUSPENSION SMELTING METHOD, A BURNER AND A METALLURGICAL EQUIPMENT

FIELD OF THE INVENTION

The invention relates to the field of nonferrous metallurgical technology, in particular to a method and an equipment for smelting metal sulfide concentrate comprising copper, nickel, lead, zinc and the like to obtain sulfur and even metal product.

BACKGROUND OF THE INVENTION

In pyrometallurgy industry, smelting of sulfide concentrate is a process to obtain metals by eventually removing sulfur and iron in the sulfide ore through their reaction with oxygen. The pyro-metallurgy processes may be roughly divided into two broad categories, including bath smelting and spatial suspension smelting, in which the essence of spatial suspension smelting is to fully combine the material particles with oxygen by taking advantage of the huge surface area of the dried powdered sulfide ore, such that the oxidation reaction is completed in a moment (2~3 s). The most widely applied spatial levitation smelting is Outokumpu flash smelting invented by Finnish scientists in 1949, and the core process of which uses direct flow jet technology. Due to the effect from characteristics of direct flow, adverse situations such as low utilization rate of oxygen, high dust rate, serious furnace lining erosion-corrosion, formation of raw material heap resulted from accumulation of unreacted concentrate in the furnace and the like often occur in the production. As smelting technologies are developed towards the "four-high" direction, i.e. high feeding amount, high load, high oxygen concentration and high operation rate, it is increasingly difficult for direct flow jet technology to meet the requirements for modern pyrometallurgy.

In recent years, rotation-jet technology has been applied well in the pyro-metallurgy industry, for example, the method presented by Chinese patent No. 200910230500.3, but situations including serious wear of the equipments and reaction segregation due to sorting of the concentrate flow are encountered in the production using this method: improved schemes are the methods as presented by Chinese patents (Patent No. ZL 201020284998 and No. 201110208013.4), and both methods include disposing the whole of the concentrate in an outer ring of a reactive air swirl, and propelling movement of particles of the concentrate by means of swirl expansion to form a high-speed rotating mixed swirl and to complete mass transfer and heat transfer between the gas and the particles. However, the methods described above have the following problems in the production practices: since the entrainment outside the swirl is too large, a large amount of high-temperature off-gas after the reaction is caused to flow back to the top of reaction tower, rendering the depletion at the top of the reaction tower too rapid: for individual concentrate particles whose properties including physical specification, specific gravity and chemical composition vary greatly, the rotation intensity may be adjusted but is difficult to control: it is not enough to propel rotary motion of the particles if the rotation intensity is too low, while flash phenomenon occurs to damage the furnace body if the rotation intensity is too high; as the reaction gas diffuses from the inside out and reaches the outer ring of the material circle, most oxygen has been depleted, so that particles of the concentrate in the outer ring of the material circle cannot be oxidized.

SUMMARY OF THE INVENTION

In view of above, the invention provides a novel rotation-suspension smelting method to solve the technical problems found in the above process schemes.

The invention provides a rotation-suspension smelting burner for implementing the above method.

The invention provides a metallurgical equipment using the above rotation-suspension smelting burner.

To achieve the above objects, the invention provides a technical solution as follows:

a rotation-suspension smelting method, in which a dry powdered sulfide concentrate and a corresponding amount of an oxygen-containing gas are sprayed into a space within a high-temperature reaction tower, with a characteristic "wind-concentrate-wind" arrangement on the horizontal plane; wherein:

the oxygen-containing gas includes the first oxygen-containing gas and the second oxygen-containing gas; the second oxygen-containing gas is sprayed vertically down in the form of an annular direct flow into the reaction tower, and forms in the reaction tower a bell-shaped wind curtain that gradually expands horizontally and extends vertically under the effect of high temperature; and the first oxygen-containing gas is transformed into a rotation-jet and jetted into the center of the wind curtain;

a metered amount of the dry sulfide concentrate enters an annular space between the two gas flows of the rotation-jet and the wind curtain, in a direction deviated towards the central axis;

in the center of the wind curtain, a circumferential expansion movement of the rotation-jet rotating at a high speed draws in the sulfide concentrate and a high-temperature gas flow from the bottom of the reaction tower simultaneously, forming a gas-particle two-phase rotation-jet that rotates and expands horizontally and moves down vertically; and during the movement process, the sulfide concentrate is ignited by a high-temperature off-gas and the high temperature radiated in the reaction tower, resulting in a violent combustion reaction with oxygen and release off $SO_2$-rich off-gas, at the same time, a mixed melt containing matte (or metal) and slag is produced from the reaction; and the matte (or metal) is finally separated from the slag at the bottom of the reaction tower, thereby completing the metallurgical process.

Preferably, the first oxygen-containing gas and the second oxygen-containing gas are the same reaction gas with the same pressure, temperature and oxygen content, wherein the oxygen content thereof is 25 wt % to 95 wt % $O_2$.

Preferably, the sum of the oxygen contained in the first oxygen-containing gas and the second oxygen-containing gas is the total amount required for the reaction of the sulfide concentrate, the distribution proportion being 20-80% (volume ratio).

Preferably, the rotation-jet has a rotation strength ≥0.5; and the second oxygen-containing gas has a speed of 30-200 m/s when entering the reaction tower.

Preferably, the dry powdered sulfide concentrate refers to sorted ores comprising metal sulfides of Cu, Ni, Pb and/or Zn.

As can be seen from the above technical solution, the rotation-suspension smelting method provided by the invention involves disposing the sulfide concentrate between two layers of oxygen-containing reaction gas, and drawing in the sulfide concentrate and the high-temperature gas flow from the bottom of the reaction tower simultaneously by means of the circumferential expansion movement of the oxygen-containing gas in the middle that rotates at a high speed, to form a gas-particle two-phase rotation-jet that rotates and expands horizontally and moves down vertically. When the gas-particle two-phase rotation-jet expands outwards and reaches the inner curtain wall of the wind curtain, its further disordered outward expansion is prevented under the control of the gathering effect of the wind curtain, thereby eliminating the flash phenomenon: the wind curtain supplements the gas-particle two-phase rotation-jet in the outer ring thereof with the wind entrainment amount required for the outside uninterruptedly to compensate for the oxygen potential in the outer ring of the gas-particle two-phase rotation-jet, and to prevent a large amount of high-temperature off-gas after the reaction from flowing back to the top of the reaction tower which would cause the depletion at the top of the reaction tower too rapid; what is more beneficial is that the convergence of the two gas flows form a violent turbulent flow, which renders the motion trajectory of particles of the concentrate in the space random and disordered and facilitates the collision between particles of the concentrate, thereby providing dynamic conditions for the mass transfer and heat transfer between particles of the concentrate.

To achieve the above process object, the invention also provides a rotation-suspension smelting burner, which has a cylindrical structure fitted together, including: a tubular auxiliary nozzle located on the central axis: a cylindrical cyclone fitted around the auxiliary nozzle: a guide vane located between the cyclone and the nozzle: a feeding pipe fitted around the cyclone; and a wind pipe fitted around the feeding pipe:

wherein a rotation passage is formed between the outer pipe wall of the nozzle and the inner pipe wall of the cyclone: a feeding cavity that gradually contracts at the bottom and deviates towards the central axis is formed between the outer pipe wall of the cyclone and the inner pipe wall of the feeding pipe; and a gas chamber having a straight-pipe segment at the bottom is formed between the outer pipe wall of the feeding pipe and the inner wall of the wind pipe.

Preferably, the outlet plane of the nozzle is inside the outlet plane of the cyclone, and the outlet plane of the cyclone exceeds the outlet plane of the feeding pipe by a height h1 of 30 to 100 mm.

Preferably, the inner wall of the outlet of the feeding pipe is a bluff body that gradually contracts in the direction towards the central axis.

Preferably, the outlet of the wind pipe is a straight-pipe segment having a straight-pipe length h2 of 100 to 400 mm.

Preferably, a regulating valve for distributing the flow ratio of the oxygen-containing gas is further included.

The inlets of the rotation passage and the gas chamber are both connected to a gas source of the oxygen-containing gas through a pipe with a regulating valve installed thereon.

Preferably, the gas chamber has a funnel shape with a cross-sectional area of the inlet larger than that of the outlet.

The invention also provides a metallurgical equipment including a reaction tower and a rotation-suspension smelting burner which is the rotation-suspension smelting burner described above.

The invention has the following beneficial effects:

firstly, the utilization rate of oxygen is high, and the materials are reacted fully with oxygen;

secondly, the high probability of collision between particles of the concentrate facilitates the settlement after the reaction, leading to a low dust generation rate;

thirdly, the large capacity can meet the requirements for wide fluctuations in feeding amount, allowing a low energy consumption and a small investment;

fourthly, the flash phenomenon of the rotation and the backflow phenomenon of a large amount of high-temperature off-gas in the outer ring are eliminated, allowing a small space required for the reaction, no dead reaction zones, and a minimal erosion effect on the refractory of the furnace body; and fifthly, the construction is simple, which is convenient and reliable in terms of the control, operation and maintenance, and runs at a low cost by fully utilizing the potential energy of the fluid.

DESCRIPTION OF THE DRAWINGS

To explain the examples of the invention or the technical solutions in the prior art more clearly, the drawings that are needed to describe the examples or the prior art are introduced briefly below: apparently, the drawings described below are only certain examples of the invention, and for those ordinary skilled in the art, other drawings may also be obtained according to these drawings on the premise of no creative work.

In the figures, 1 is a nozzle: 2 is a cyclone and 21 is a first wind inlet: 3 is a feeding pipe, 31 is a second feeding inlet, and 32 is a bluff body: 4 is a wind pipe and 41 is a third wind inlet: 5 is a guide vane: 6 is a regulating valve; 7 is an oxygen-containing gas, 71 is a first oxygen-containing gas, and 72 is a second oxygen-containing gas, 73 is a rotation-jet, and 74 is an wind curtain; 8 is a gas chamber; 9 is a feeding cavity; 10 is a rotation passage; 11 is a concentrate; 12 is a two-phase rotation-jet: and 13 is a reaction tower.

DETAILED DESCRIPTION OF THE INVENTION

The invention provides a novel rotation-suspension smelting method to improve oxygen utilization rate and to allow the materials to react fully with oxygen: which method eliminates the flash phenomenon of the swirl and the backflow phenomenon of a large amount of high-temperature off-gas in the outer ring, allowing a small space required for the reaction, no dead reaction zones, and a minimal erosion effect on the refractory of the furnace body. The invention provides a rotation-suspension smelting burner to implement the above method, and a metallurgical equipment using the above burner.

The technical solutions according to examples of the invention are described clearly and fully below with reference to the drawings in the examples of the invention. Apparently, the examples described are only part of the examples according to the invention, rather than all of examples. All the other examples obtained by those ordinary skilled in the art on the premise of no creative work, based on the examples according to the invention, fall within the scope claimed by the invention.

Figure 1:
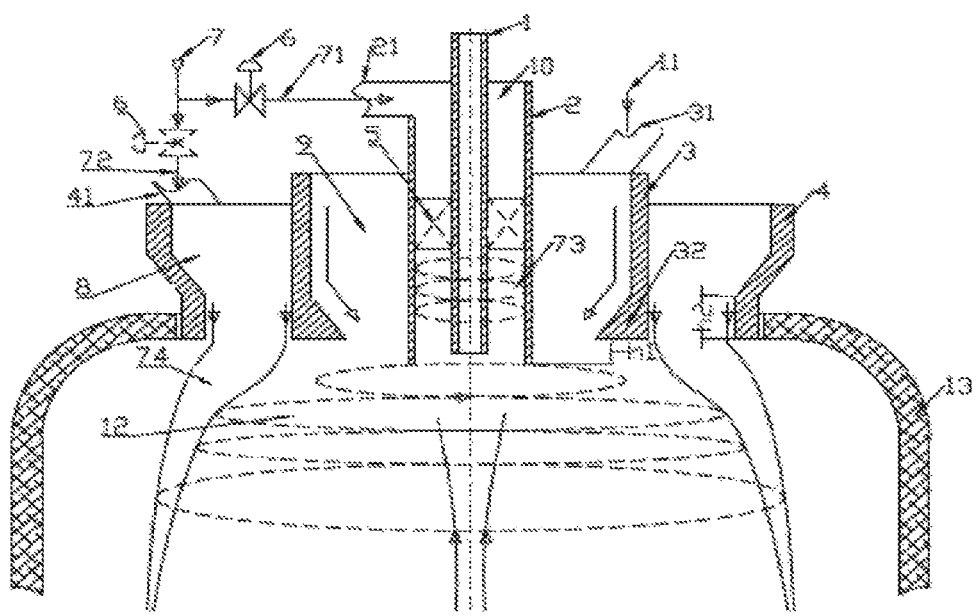
FIG. 1 is a schematic diagram of a process scheme and a construction of a metallurgical equipment provided according to an example of the invention.
Figure 2:
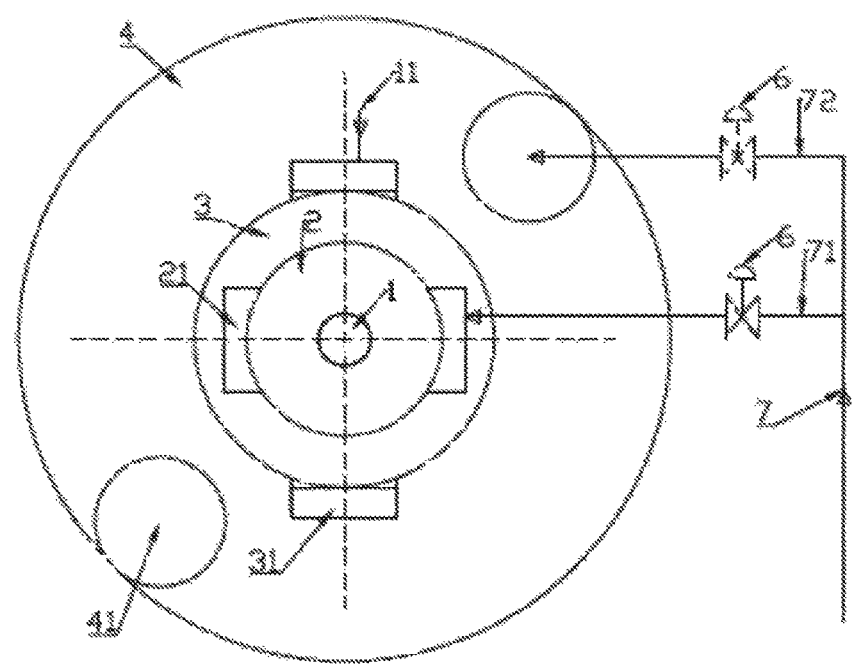
FIG. 2 is a schematic top view of the metallurgical equipment provided according to an example of the invention.

Please refer to FIG. 1 and FIG. 2. FIG. 1 is a schematic diagram of a process scheme and a construction of a metallurgical equipment provided according to an example of the invention; and FIG. 2 is a schematic top view of a metallurgical equipment provided according to an example of the invention.

The rotation-suspension smelting method provided according to an example of the invention has core improvements in that: a dry powdered sulfide concentrate 11 and a corresponding amount of an oxygen-containing gas 7 are sprayed into a space within a high-temperature reaction tower 13, with a characteristic "wind-concentrate-wind" arrangement on the horizontal plane; wherein:

the oxygen-containing gas 7 includes a first oxygen-containing gas 71 and a second oxygen-containing gas 72, in which the second oxygen-containing gas 72 is sprayed vertically down in the form of an annular direct flow into the reaction tower 13 and forms in the reaction tower 13 a bell-shaped wind curtain 74 that gradually expands horizontally and extends vertically under the effect of high temperature: and the first oxygen-containing gas 71 is transformed into a rotation-jet 73 and jetted vertically down into the center of the wind curtain 74;

a metered amount of the dry sulfide concentrate 11 falls freely and vertically, and enters from the top downward an annular space between the two gas flows of the rotation-jet 73 and the wind curtain 74, in a direction deviated towards the central axis;

in the center of the wind curtain 74, a circumferential expansion movement of the rotation-jet 73 rotating at a high speed draws in the sulfide concentrate 11 and a high-temperature gas flow from the bottom of the reaction tower 13 simultaneously, forming a gas-particle two-phase rotation-jet 12 that rotates and expands horizontally and moves down vertically: and the construction thereof can be seen in FIG. 1;

during the movement process, the sulfide concentrate 11 is ignited by a high-temperature off-gas and the high temperature radiated in the reaction tower 13, resulting in a violent combustion reaction with oxygen and release of $SO_2$-rich off-gas, at the same time, a mixed melt containing matte (or metal) and slag is produced from the reaction; and the matte (or metal) is finally separated from the slag at the bottom of the reaction tower 13, thereby completing the metallurgical process.

As can be seen from the above technical solution, the rotation-suspension smelting method provided according to the example of the invention involves disposing the sulfide concentrate 11 between two layers of oxygen-containing reaction gas, and drawing in the sulfide concentrate 11 and the high-temperature gas flow from the bottom of the reaction tower 13 simultaneously by means of the circumferential expansion movement of the oxygen-containing gas (i.e. rotation-jet 73) in the middle that rotates at a high speed, to form a gas-particle two-phase rotation-jet 12 that rotates and expands horizontally and moves down vertically. When the gas-particle two-phase rotation-jet 12 expands outwards and reaches the inner curtain wall of the wind curtain 74, its further disordered outward expansion is prevented under the control of the gathering effect of the wind curtain 74, thereby eliminating the flash phenomenon: the wind curtain 74 supplements the gas-particle two-phase rotation-jet 12 in the outer ring thereof with the wind entrainment amount required for the outside uninterruptedly to compensate for the oxygen potential in the outer ring of the gas-particle two-phase rotation-jet 12, and to prevent a large amount of high-temperature off-gas after the reaction from flowing back to the top of the reaction tower 13 which would cause the depletion at the top of the reaction tower 13 too rapid; what is more beneficial is that the convergence of the two gas flows form a violent turbulent flow, which renders the motion trajectory of particles of the concentrate 11 in the space random and disordered and facilitates the collision between particles of the concentrate 11, thereby providing dynamic conditions for the mass transfer and heat transfer between particles of the concentrate 11.

The properties of the oxygen-containing gas 7 can be determined by those skilled in the art according to the practical process requirements. In a specific example provided according to the present embodiment, the first oxygen-containing gas 71 and the second oxygen-containing gas 72 are the same reaction gas with the same pressure, temperature and oxygen content, their oxygen content being 25 wt % to 95 wt %. As such, the first oxygen-containing gas 71 and the second oxygen-containing gas 72 may be provided by the same gas source, helping to simplify the construction of the metallurgical equipment.

To further optimize the above technical solution, the sum of the oxygen comprised in the first oxygen-containing gas 71 and the second oxygen-containing gas 72 is the total amount required for reaction of the sulfide concentrate 11, with the distribution proportion being 20-80% (volume ratio). The specific ways of distribution is determined according to actual situations and is not limited herein.

Preferably, the first oxygen-containing gas 71 is transformed into the rotation-jet 73 having a rotation strength ≥0.5 through an axially mounted guide vane 5; and the second oxygen-containing gas 72 is a vertically downward direct flow having a speed of 30 to 200 m/s at the burner outlet (that is, when entering the reaction tower 13) for purpose of achieving a better effect of the rotation-suspension smelting reaction.

In a specific example provided according to the present embodiment, the dry powdered sulfide concentrate 11 refers to sorted ores comprising metal sulfides of Cu, Ni. Pb and/or Zn, and the like.

To achieve the above process objects, an example according to the invention also provide a rotation-suspension smelting burner for being installed downward vertically in the hole at the top of the obconical reaction tower 13, the core improvements of which are in that: the rotation-suspension smelting burner has a cylindrical structure fitted together, including: from the inside out, a tubular auxiliary nozzle 1 located on the central axis; a cylindrical cyclone 2 fitted around the auxiliary nozzle 1: an axially mounted guide vane 5 located between the cyclone 2 and the nozzle 1, a feeding pipe 3 fitted around the cyclone 2; and a wind pipe 4 fitted around the feeding pipe 3:

wherein a rotation passage 10 is formed between the outer pipe wall of the nozzle 1 and the inner pipe wall of the cyclone 2: a feeding cavity 9 that gradually contracts at the bottom and deviates towards the central axis is formed between the outer pipe wall of the cyclone 2 and the inner pipe wall of the feeding pipe 3; and a gas chamber 8 having a straight-pipe segment at the bottom is formed between the outer pipe wall of the feeding pipe 3 and the inner wall of the wind pipe 4.

Preferably, the guide vane 5 is mounted axially on the outer wall of the nozzle 1, and is located in the middle part of the length of the cyclone 2 to obtain the rotation-jet 73 suitable for the rotation-suspension smelting reaction. To further optimize the above technical solution, the outlet plane of the nozzle 1 is inside the outlet plane of the cyclone 2, and as shown in FIG. 1, in a vertical direction, the outlet at the bottom of the nozzle 1 is above the outlet of the cyclone 2: the outlet plane of the cyclone 2 exceeds the outlet plane of the feeding pipe 3 by a height h1 of 30 to 100 mm, that is, in a vertical direction, the outlet at the bottom of the cyclone 2 is 30 to 100 mm lower than the outlet of the feeding pipe 3; and the outlets at the bottoms of the feeding pipe 3 and the wind pipe 4 may be of same level. By the above construction design, both the way and the timing for the reaction materials to enter the reaction tower 13 are optimized, thus a better effect of the rotation-suspension smelting reaction can be obtained.

In a specific example provided according to the present embodiment, the inner wall of the outlet of the feeding pipe 3 is an annularly disposed bluff body 32 that gradually contracts in the direction towards the central axis, and the outer pipe of the cyclone 2 is a round pipe with a vertically uniform diameter (the structure of which may be seen with reference to FIG. 1), thus serving to decelerate and guide the concentrate 11.

Preferably, the outlet of the wind pipe 4 is a straight-pipe segment having a straight-pipe length h2 of 100 to 400 mm to ensure that the second oxygen-containing gas 72 can be sprayed vertically down in the form of an annular direct flow into the reaction tower, and be formed into a bell-shaped wind curtain 74 that gradually expands horizontally and extends vertically.

The rotation-suspension smelting burner provided according to an example of the invention also includes a regulating valve 6 for distributing the flow ratio of the oxygen-containing gas 7.

The inlets of the rotation passage 10 and the gas chamber 8 are both connected to a gas source of the oxygen-containing gas 7 through a pipe with the regulating valve 6 installed on the pipe. The number of the regulating valve 6 may be one or two: when one regulating valve is used, the flow ratio can be adjusted by installing it on any one of the branched pipes: in a specific example provided according to the present embodiment, two regulating valves 6 are used and installed on the gas-intake branched pipes of the first oxygen-containing gas 71 and the second oxygen-containing gas 72, respectively, the construction thereof may be seen with reference to FIG. 1.

The number of the first wind inlet(s) 21 for connecting the outlet of the gas source and the inlet of the rotation passage 10, which are installed at the upper part of the cyclone 2, may be 1, 2 or 3, or the like. Preferably, a plurality of the first wind inlets 21 described above are distributed evenly in the circumferential direction of the cyclone 2, and the gas-intake direction is perpendicular to the axial direction of the cyclone 2.

The number of the second feeding inlets 31 for inward feeding and connecting with the inlet of the feeding cavity 9, which are installed symmetrically at the upper part of the feeding pipe 3, may be an even number, for example, 2, 4, 6 or the like. Preferably, the gas-intake direction of the second feeding inlets 31 described above is oriented towards the direction of the central axis of the feeding pipe 3.

The number of the third wind inlets 41 for connecting the outlet of the gas source and the inlet of the gas chamber 8, which are installed symmetrically at the top of the wind pipe 4, may be an even number, for example, 2, 4, 6 or the like. Preferably, the gas-intake direction of the third feeding inlets 41 described above is oriented towards the direction of the central axis of the wind pipe 4, and the construction thereof may be seen with reference to FIG. 2.

Further, the gas chamber 8 has a funnel shape with a cross-sectional area of the inlet larger than that of the outlet. As shown in FIG. 1, the internal diameter of the inlet of the wind pipe 4 is larger than that of its outlet, and there is a slope oriented towards the direction of the central axis between the inlet and the outlet, that is, the inner pipe wall of the wind pipe 4 is funnel-shaped: and the outer pipe wall of the feeding pipe 3 has a regular circumferential surface, thus forming a funnel-shaped gas chamber 8 between the outer pipe wall of the feeding pipe 3 and the inner pipe wall of the wind pipe 4, such a structure that is large at the upper part and small at the lower part serves to accelerate the rate of the second oxygen-containing gas 72 flowing therein.

The burner provided according to the present embodiment is further explained below in combination with a specific operating process.

As shown in FIG. 1, after the feeding amount is determined, the dry powdered sulfide concentrate 11 and a corresponding amount of the oxygen-containing gas 7 are sprayed into the space in the high-temperature reaction tower 13 through the above rotation-suspension smelting burner, which presents a "wind-concentrate-wind" arrangement feature on the horizontal plane, in which:

before the oxygen-containing gas 7 is sent to the equipment via a pipe, the pipe is bifurcated into two branches, and the corresponding oxygen-containing gas 7 is divided into two parts, the first oxygen-containing gas 71 and the second oxygen-containing gas 72, in which the second oxygen-containing gas 72 is sprayed in the form of an annular direct flow through the gas chamber 8 of the nozzle into the reaction tower 13; and the first oxygen-containing gas 71 passes through the cyclone 2, and is transformed into the rotation-jet 73 by the guide vanes 5 and jetted into the center of the annular direct flow of the second oxygen-containing gas 72.

A metered amount of the dry sulfide concentrate 11 falls freely and vertically through the annular passage feeding cavity 9 of the nozzle, and at the outlet of the annular passage feeding cavity 9, enters the annular space between the two gas flows in a direction deviated towards the central axis under the decelerating and guiding effect of the annularly disposed bluff body 32 inclining towards the axis.

After leaving the burner and entering the reaction tower 13, the annular direct flow of the second oxygen-containing gas 72 is mainly affected by the high temperature in the reaction tower 13 and forms a bell-shaped wind curtain 74 that gradually expanded horizontally and extended vertically in the space of the reaction tower 13: and in the center of the wind curtain 74, the sulfide concentrate 11 and the high-temperature gas flow from the bottom of the reaction tower 13 are drawn in simultaneously by means of the circumferential expansion movement of the oxygen-containing gas (i.e. rotation-jet 73) that rotates at a high speed, leading to formation of a gas-particle two-phase rotation-jet 12 that rotates and expands horizontally and moves down vertically.

When the gas-particle two-phase rotation-jet 12 expands outwards and reaches the inner curtain wall of the wind curtain 74, its further disordered outward expansion is prevented under the control of the gathering effect of the wind curtain 74, thereby eliminating the flash phenomenon: the wind curtain 74 supplements the gas-particle two-phase rotation-jet 12 in the outer ring thereof with the wind entrainment amount required for the outside uninterruptedly to compensate for the oxygen potential in the outer ring of the gas-particle two-phase rotation-jet 12, and to prevent a large amount of high-temperature off-gas after the reaction from flowing back to the top of the reaction tower which would cause the depletion at the top of the reaction tower too rapid; what is more beneficial is that the convergence of the two gas flows form a violent turbulent flow, which renders the motion trajectory of particles of the concentrate 11 in the space random and disordered and facilitates the collision between particles of the concentrate 11, thereby providing dynamic conditions for the mass transfer and heat transfer between particles of the concentrate 11.

During the movement process, the sulfide concentrate 11 is ignited by the high-temperature off-gas and the high temperature radiated in the reaction tower 13, resulting in a violent combustion reaction with oxygen and release of $SO_2$-rich off-gas, at the same time, a mixed melt containing matte (or metal) and slag is produced from the reaction; and the matte (or metal) is finally separated from the slag at the bottom of the reaction tower 13, thereby completing the metallurgical process.

An example according to the invention also provide a metallurgical equipment, including the reaction tower 13 and a rotation-suspension smelting burner, and the core improvements of which are in that: the rotation-suspension smelting burner is the above rotation-suspension smelting burner installed vertically downward in the hole at the top of the obconical reaction tower 13.

To sum up, the example according to the invention provides a method for rotation-suspension smelting sulfide concentrate powder, in which the dry powdered sulfide concentrate 11 and a corresponding amount of the oxygen-containing gas 7 are sprayed into the space of the high-temperature reaction tower 13 through an equipment. The oxygen-containing gas 7 is divided into two parts, i.e. the first oxygen-containing gas 71 and the second oxygen-containing gas 72, before entering the equipment. The second oxygen-containing gas 72 is sprayed in the form of an annular direct flow into the reaction tower 13 and forms a bell-shaped wind curtain 74: and the first oxygen-containing gas 71 is transformed into the rotation-jet 73 via the equipment and jetted into the center of the wind curtain 74. In the annular space between the two gas flows, the concentrate 11 entering in a direction deviated towards the center is drawn in the rotation-jet 73, and the high-temperature off-gas from the bottom of the reaction tower 13 is also sucked in, forming a gas-particle mixed two-phase rotation-jet 12. The sulfide concentrate 11 is ignited by the high temperature, namely, starting a violent combustion reaction with oxygen and releasing $SO_2$-rich off-gas, at the same time, a mixed melt containing matte (or metal) and slag is formed; and the matte (or metal) is finally separated from the slag at the bottom of the reaction tower 13, thereby completing the metallurgical process. To achieve the process object, the invention also provides a metallurgical equipment and a rotation-suspension smelting burner thereof.

Each example in the present specification is described in a progressive way; all that each example highlights are the differences from other examples, and the same or similar parts among respective example may refer to each other.

The above descriptions of the disclosed examples can allow those skilled in the art to implement or use the invention. Various modifications to these examples are apparent to those skilled in the art, and the general principle defined herein may be implemented in other examples without departing from the spirit or scope of the invention. Therefore, the invention shall not be limited to these examples illustrated herein, but corresponds to the broadest scope consistent with the principle and novel features disclosed herein.

The invention claimed is:

1. A rotation-suspension smelting burner, wherein the rotation-suspension smelting burner has cylindrical structure fitted together, comprising: a tubular auxiliary nozzle located on a central axis; a cylindrical cyclone fitted around the auxiliary nozzle; a guide vane located between the cyclone and the nozzle; a feeding pipe fitted around the cyclone; and a wind pipe fitted around the feeding pipe; and wherein a rotation passage is formed between an outer pipe wall of the nozzle and an inner pipe wall of the cyclone; a feeding cavity that gradually contracts at a bottom and deviates towards a central axis is formed between an outer pipe wall of the cyclone and an inner pipe wall of the feeding pipe; and a gas chamber having a straight-pipe segment at a bottom is formed between an outer pipe wall of the feeding pipe and an inner wall of the wind pipe.

2. The rotation-suspension smelting burner according to claim 1, wherein an outlet plane of the nozzle is inside an outlet plane of the cyclone, and the outlet plane of the cyclone exceeds an outlet plane of the feeding pipe by a height h1 of 30 to 100 mm.

3. The rotation-suspension smelting burner according to claim 1, wherein an inner wall of an outlet of the feeding pipe is a bluff body that gradually contracts in a direction towards the central axis.

4. The rotation-suspension smelting burner according to claim 1, wherein an outlet of the wind pipe is a straight-pipe segment having a straight-pipe length h2 of 100 to 400 mm.

5. The rotation-suspension smelting burner according to claim 1, further comprising a regulating valve for distributing a flow ratio of oxygen-containing gas;

wherein inlets of the rotation passage and the gas chamber are both connected to a gas source of the oxygen-containing gas through a pipe with the regulating valve installed on the pipe.

6. The rotation-suspension smelting burner according to claim 1, wherein the gas chamber has a funnel shape with a cross-sectional area of an inlet larger than that of an outlet.

7. A metallurgical equipment, comprising a reaction tower and a rotation-suspension smelting burner, wherein the rotation-suspension smelting burner is the rotation-suspension smelting burner according to claim 1.

* * * * *